(12) United States Patent
Bernert et al.

(10) Patent No.: US 9,649,989 B2
(45) Date of Patent: May 16, 2017

(54) KEYBOARD MOUNTING SYSTEM

(71) Applicant: Havis, Inc., Warminster, PA (US)

(72) Inventors: Joseph Bernert, Hatboro, PA (US); Steve Telesco, Dexter, MI (US); Seth Elihu Kirkendall, Dearborn, MI (US)

(73) Assignee: Havis, Inc., Warminster, PA (US)

( * ) Notice: Subject to any disclaimer, the term of this patent is extended or adjusted under 35 U.S.C. 154(b) by 0 days.

(21) Appl. No.: 14/827,745

(22) Filed: Aug. 17, 2015

(65) Prior Publication Data
US 2017/0050580 A1 Feb. 23, 2017

(51) Int. Cl.
| | |
|---|---|
| *G06F 1/16* | (2006.01) |
| *B60R 11/02* | (2006.01) |
| *F16B 2/12* | (2006.01) |
| *G06F 1/18* | (2006.01) |
| *H01H 13/70* | (2006.01) |

(52) U.S. Cl.
CPC ............... *B60R 11/02* (2013.01); *F16B 2/12* (2013.01); *G06F 1/18* (2013.01); *H01H 13/70* (2013.01)

(58) Field of Classification Search
CPC ................................................... G06F 1/1669
See application file for complete search history.

(56) References Cited

U.S. PATENT DOCUMENTS

| 5,555,491 | A * | 9/1996 | Tao | G06F 1/1632 248/185.1 |
|---|---|---|---|---|
| 5,859,762 | A * | 1/1999 | Clark | F16M 11/08 248/122.1 |
| 6,280,212 | B1 * | 8/2001 | Nguyen | G06F 1/1632 439/157 |
| 7,097,082 | B2 * | 8/2006 | Wallaker | B60R 11/02 224/483 |
| 7,506,843 | B2 * | 3/2009 | McKelvey | B60R 11/02 224/483 |

(Continued)

FOREIGN PATENT DOCUMENTS

| JP | H05153524 A | 6/1993 |
|---|---|---|
| JP | 2005041441 A | 2/2005 |
| WO | 0115940 A1 | 3/2001 |

OTHER PUBLICATIONS

Great Britain Search Report for GB Application No. GB1614031.1, dated Jan. 26, 2017, 1 page.

*Primary Examiner* — Anthony Q Edwards
(74) *Attorney, Agent, or Firm* — RatnerPrestia

(57) ABSTRACT

Systems, apparatuses, and methods for mounting an object such as a keyboard within a vehicle are disclosed. One mounting system includes a keyboard and a mounting apparatus. The keyboard includes at least one aperture. The mounting apparatus includes a base, a slide plate, a latch, and a locking mechanism. The slide plate is coupled to the base and is slidable in a predetermined direction relative to the base. The latch is movable between an engaged position that prevents the slide plate from sliding relative to the base and a disengaged position that does not prevent the slide plate from sliding relative to the base. The locking mechanism is movable between a locked position in which the locking mechanism engages the at least one aperture to lock the keyboard to the slide plate and an unlocked position in which the locking mechanism does not engage the at least one aperture.

18 Claims, 9 Drawing Sheets

(56) References Cited

U.S. PATENT DOCUMENTS

| | | | |
|---|---|---|---|
| 7,978,466 B2* | 7/2011 | Lewandowski | G06F 1/1632 361/679.41 |
| 8,074,951 B2* | 12/2011 | Carnevali | B60R 11/02 108/143 |
| 8,821,173 B2* | 9/2014 | Carnevali | G06F 1/1632 361/679.41 |
| 2002/0064030 A1 | 5/2002 | Shimizu | |
| 2002/0131234 A1* | 9/2002 | Sterner | G06F 1/1632 361/679.41 |
| 2008/0002354 A1* | 1/2008 | Carnevali | G06F 1/1632 361/679.41 |
| 2009/0014487 A1* | 1/2009 | Fan | B60R 11/02 224/483 |
| 2009/0212189 A1* | 8/2009 | Carnevali | B25B 5/02 248/346.04 |
| 2012/0045932 A1* | 2/2012 | Carnevali | G06F 1/1632 439/552 |

\* cited by examiner

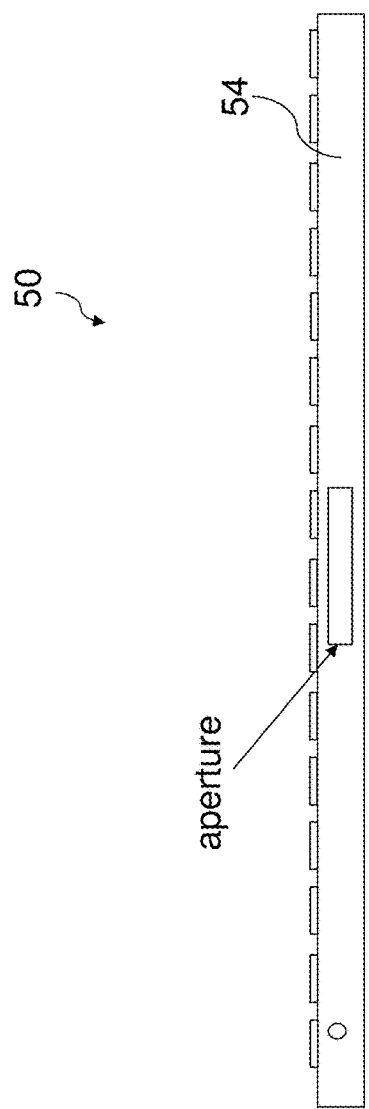

KEYBOARD MOUNTING SYSTEM

FIELD OF THE INVENTION

The present invention relates generally to mounting systems, and more particularly, to apparatuses and methods for removably mounting objects such as keyboards within a moving vehicle.

BACKGROUND OF THE INVENTION

Specialized vehicles are an essential tool in many different professions. In particular, professions such as law enforcement commonly utilize a number of specialized electronic systems (e.g., computers, radio systems, sirens) that are not found in conventional automobiles. While vehicles may be specially manufactured that include these systems, these systems may also be added to conventional automobiles through after-market installations. However, one problem that arises from such installations is the simple and effective mounting of after-market electronic devices in conventional vehicles. Improved systems are desired for repositionably mounting objects in vehicles.

SUMMARY OF THE INVENTION

Aspects of the present invention are directed to systems, apparatuses, and methods for mounting an object such as a keyboard within a vehicle.

In accordance with one aspect of the present invention, a keyboard mounting system for a vehicle is disclosed. The system includes a keyboard and a mounting apparatus. The keyboard includes a housing, one or more input elements coupled to the housing, and at least one aperture defined in the housing. The mounting apparatus includes a base, a slide plate, a latch, and a locking mechanism. The slide plate is coupled to the base and has a mounting surface facing the keyboard. The slide plate is slidable in a defined direction relative to the base. The latch is coupled to the slide plate. The latch is movable between an engaged position that prevents the slide plate from sliding relative to the base and a disengaged position that does not prevent the slide plate from sliding relative to the base. The locking mechanism is coupled to the slide plate. The locking mechanism is movable between a locked position in which the locking mechanism engages the at least one aperture to lock the keyboard to the slide plate and an unlocked position in which the locking mechanism does not engage the at least one aperture.

In accordance with another aspect of the present invention, an apparatus for mounting an object within a vehicle is disclosed. The apparatus includes a base, a slide plate, a latch, and a locking mechanism. The slide plate is coupled to the base and has a mounting surface positioned to face the object being mounted. The slide plate is slidable in a defined direction relative to the base. The latch is coupled to the slide plate. The latch is movable between an engaged position that prevents the slide plate from sliding relative to the base and a disengaged position that does not prevent the slide plate from sliding relative to the base. The locking mechanism is coupled to the slide plate. The locking mechanism is movable between a locked position in which the locking mechanism directly or indirectly engages the object being mounted to lock the object to the slide plate and an unlocked position in which the locking mechanism does not engage the object being mounted.

In accordance with yet another aspect of the present invention, a method for mounting an object within a vehicle is disclosed. The method includes positioning the object adjacent a mounting surface of a slide plate of a mounting apparatus, and moving a locking mechanism of the mounting apparatus between a locked position in which the locking mechanism directly or indirectly engages the object to lock the object to the slide plate and an unlocked position in which the locking mechanism does not engage the object being mounted.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Figure 1:
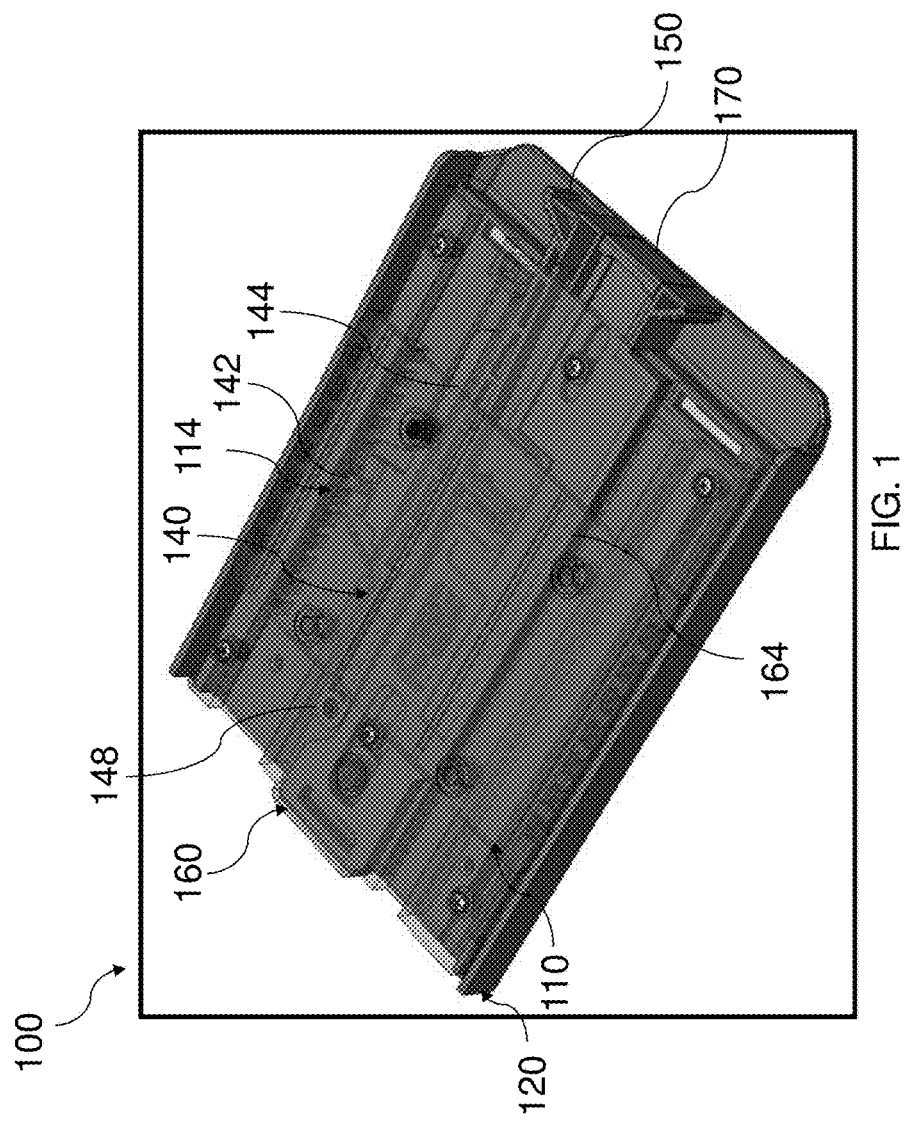
FIGS. 1 and 2 are perspective top and bottom diagrams, respectively, of an exemplary apparatus for mounting an object such as a keyboard within a vehicle in accordance with aspects of the present invention.
Figure 2:
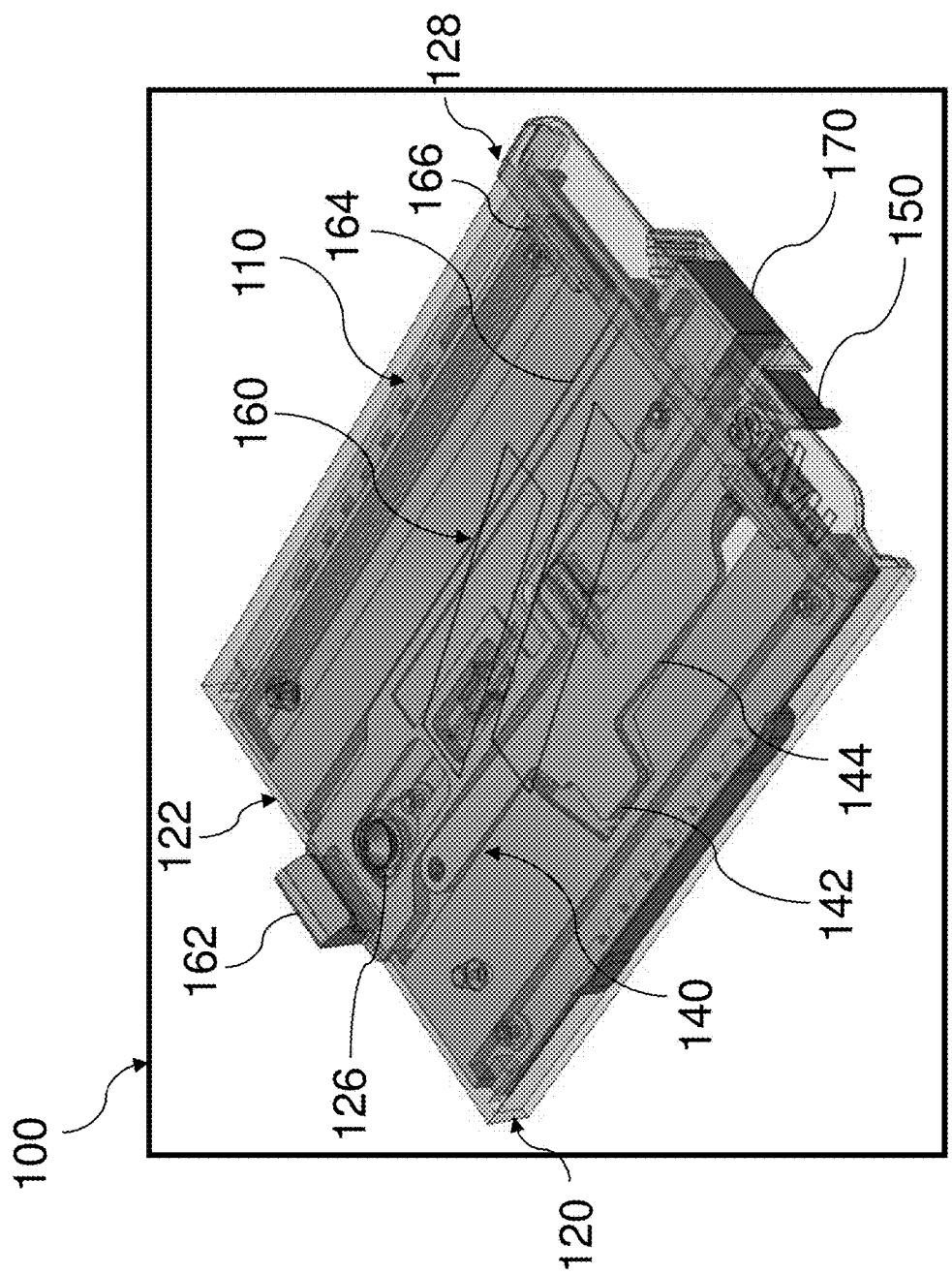

The systems, apparatuses, and methods disclosed herein are usable to mount objects within conventional vehicles (such as automobiles). While the disclosed systems are described herein with respect to mounting within the cabin of a vehicle, it will be understood that the invention is not so limited. To the contrary, aspects of the present invention are usable in any application in which a removable mount is desired.

While many different types of objects may be mounted using the disclosed apparatus and methods, the disclosed mounting systems are particularly suitable for mounting electronic devices, such as laptop or tablet keyboards. Such devices may be subject to periodic repositioning and/or removal from the vehicle, and as such, the disclosed systems, apparatuses, and methods advantageously allow such objects to be securely mounted in a vehicle while still being capable of being easily removed when desired. Other electronic devices or objects mountable with the disclosed systems will be known to those of ordinary skill in the art from the description herein.

With reference to the drawings, FIGS. 1-5 illustrate an exemplary apparatus 100 for mounting an object within a vehicle in accordance with aspects of the present invention. Apparatus 100 is usable to securely mount objects, such that they can be readily secured within or removed from the vehicle. FIG. 7 illustrates an exemplary keyboard mounting system 10 comprising apparatus 100 and a keyboard 50 to be mounted. Apparatus 100 is usable to securely mount electronic devices, such as keyboard 50, within a vehicle. In general, apparatus 100 includes a base 110, a slide plate 120, a latch 140, and a locking mechanism 160. Additional details of system 10 and apparatus 100 are provided herein.

Keyboard 50 comprises a housing with one or more input elements coupled to the housing. The form and function of input elements are not limited by the present invention. Exemplary input elements may include keys, buttons, touchscreens, scroll or track pads, or any combinations thereof.

Keyboard 50 has at least one aperture for mating with apparatus 100, the aperture indicated by arrow in FIG. 7A. In one exemplary embodiment, the aperture is defined in the housing of the keyboard. In this embodiment, the keyboard housing may have a relatively large front surface 52, smaller side surfaces 54, and a rear surface. The one or more input elements may be provided on the front surface 52, with the aperture(s) defined in one or more side surface(s) 54 of the housing. The rear surface of keyboard 50 may face apparatus 100.

Figure 7B:
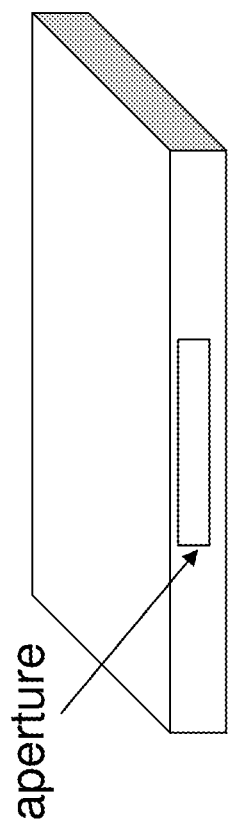
FIG. 7 is a perspective top diagram of the apparatus of FIG. 1 with an exemplary mounted object, with an upper side view of the exemplary mounted object shown in FIG. 7A, and an adaptor plate for the exemplary mounted object shown in FIG. 7B.

In an alternative embodiment, keyboard 50 is coupled to an adaptor plate which defines the aperture, the adaptor plate being shown in FIG. 7B with the aperture indicated by arrow. In this embodiment, keyboard 50 includes a plurality of threaded openings in its housing arranged in a predetermined layout. The adaptor plate includes a plurality of screws positioned to engage respective ones of the threaded openings in keyboard 50, in order for the adaptor plate to be affixed to keyboard 50. The adaptor plate defines the aperture for mating with apparatus 100.

Base 110 supports the components of apparatus 100. Base 110 may be configured to be mounted to the vehicle through one or more mounting structures (not shown). In an exemplary embodiment, base 110 can be mounted to a repositionable mounting system to enable keyboard 50 to be repositioned within the vehicle during use without the need to remove keyboard 50 from apparatus 100. Suitable repositionable mounting systems for use with the present invention are disclosed in copending U.S. patent application Ser. No. 14/745,839, the contents of which are incorporated herein by reference in their entirety. Other suitable systems and structures for mounting base 110 within a vehicle will be known to one of ordinary skill in the art from the description herein.

Slide plate 120 is coupled to base 110. Slide plate 120 has a mounting surface 122 facing the rear surface of keyboard 50 when keyboard 50 is mounted. Mounting surface 122 of slide plate 120 provides a surface against which keyboard 50 (or an adapter coupled to keyboard 50) can rest while mounted. Slide plate 120 may be sized to substantially cover and/or support a rear surface of keyboard 50 being mounted. In an exemplary embodiment, slide plate 120 includes a broad, substantially flat piece of rigid material. Suitable materials for forming slide plate 120 will be apparent to one of ordinary skill in the art.

Slide plate 120 is slidable in a defined direction relative to base 110. In an exemplary embodiment, base 110 and slide plate 120 include sliding joints, such as tongue-and-groove joints, on the sides thereof to enable sliding in the defined direction. In an alternative embodiment, base 110 includes a slot extending in a predetermined direction, and slide plate 120 includes a another slot extending in the predetermined direction. Apparatus 100 can further include a bolt or pin extending through the slots to at least partially define the direction of sliding of slide plate 120 relative to base 110. In other words, slide plate 120 slides along the defined direction established by predetermined directions of the sliding joints and/or slots.

Slide plate 120 includes at least one bumper 126 projecting from mounting surface 122. Bumper 126 contacts the rear surface of keyboard 50. Bumper 126 is formed from compressible material, and may be at least partially compressed when keyboard 50 is mounted to the mounting surface 122 of slide plate 120, as will be described below. Bumper 126 may desirably create a secure, tight mount for keyboard 50 to prevent rattling of keyboard 50 during movement of the vehicle.

Slide plate 120 may include at least one stop wall 128. Stop wall 128 provides additional support for the object being mounted on apparatus 100. In an exemplary embodiment, stop wall 128 extends upward from the mounting surface 122 of slide plate 120 along one edge thereof. Stop wall 128 provides support or a base for the side of the object being mounted, while that object is positioned adjacent mounting surface 122 of slide plate 120. Stop wall 128 may be useful for locking the object being mounted to slide plate 120, as discussed below.

Latch 140 is coupled to slide plate 120. Latch 140 may be movably coupled to slide plate 120 using one or more screws positioned in slots in latch 140. Latch 140 functions to control or limit the sliding of slide plate 120 relative to base 110. To this end, latch 140 is movable between an engaged position and a disengaged position. In the engaged position, latch 140 prevents slide plate 120 from sliding relative to base 110. In the disengaged position, latch 140 does not prevent slide plate 120 from sliding relative to base 110.

Latch 140 engages with a corresponding structure on base 110. In an exemplary embodiment, base 110 comprises a plurality of detents 114, and latch 140 includes at least one projection 142. Detents 114 are arranged in a row on a surface of base 110, the row extending along the sliding direction of slide plate 120 relative to base 110. Latch 140 has a corresponding elongated body 144 with projection 142 extending outward from body 144 toward the row of detents 114. Projection 142 is positioned such that when latch 140 is in the engaged position, projection 142 engages with at least one of detents 114. This engagement between projection 142 and detents 114 blocks slide plate 120 from sliding along the defined direction.

In a further embodiment, latch 140 includes a biasing element 146 for biasing latch 140 to be in the engaged position. Latch 140 is rotatable around an axis 148 for moving between the engaged and disengaged positions, and biasing element 146 biases latch 140 to rotate to the engaged position.

Figure 3:
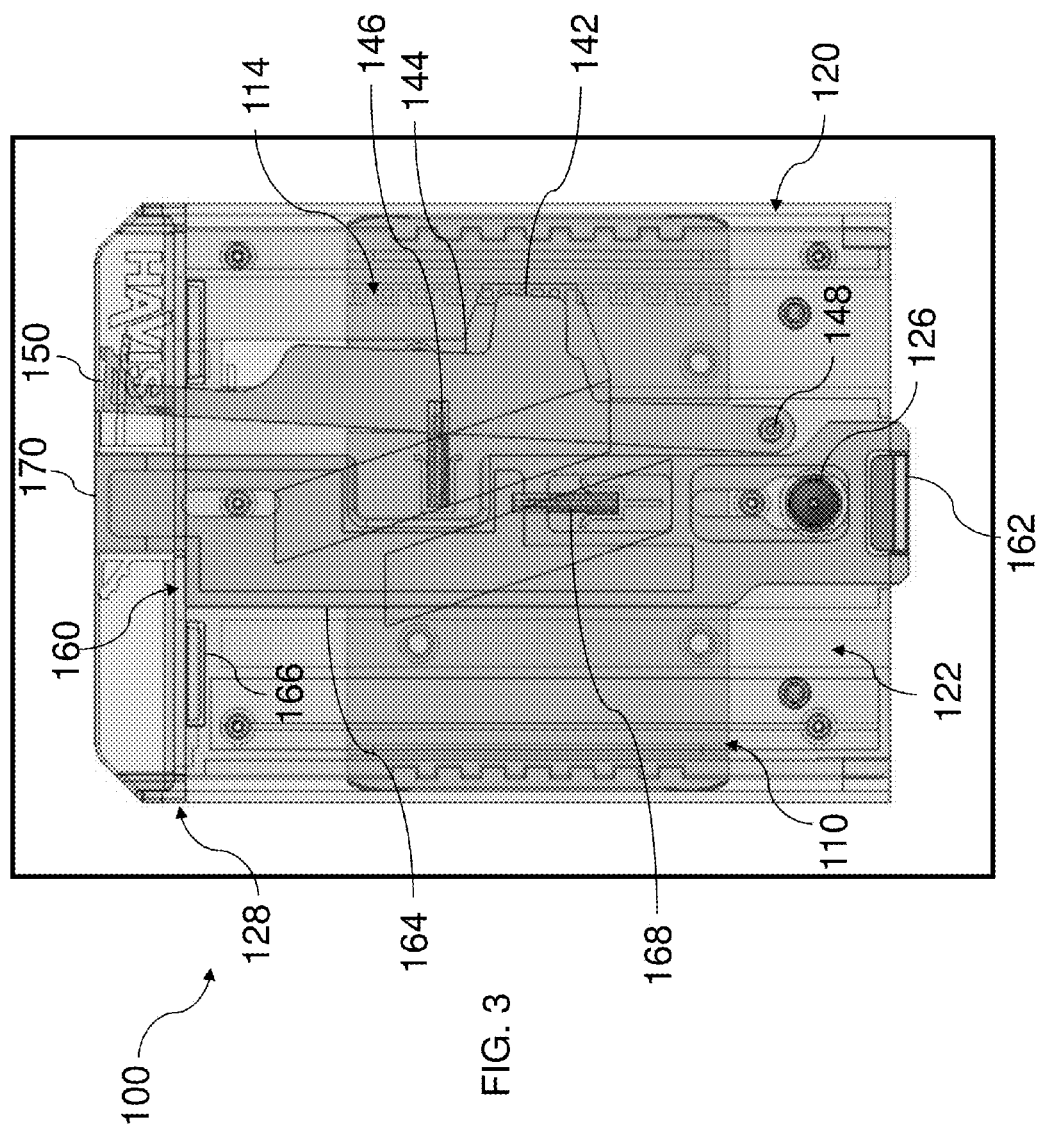
FIGS. 3 and 4 are top and side diagrams, respectively, of the apparatus of FIG. 1.
Figure 4:
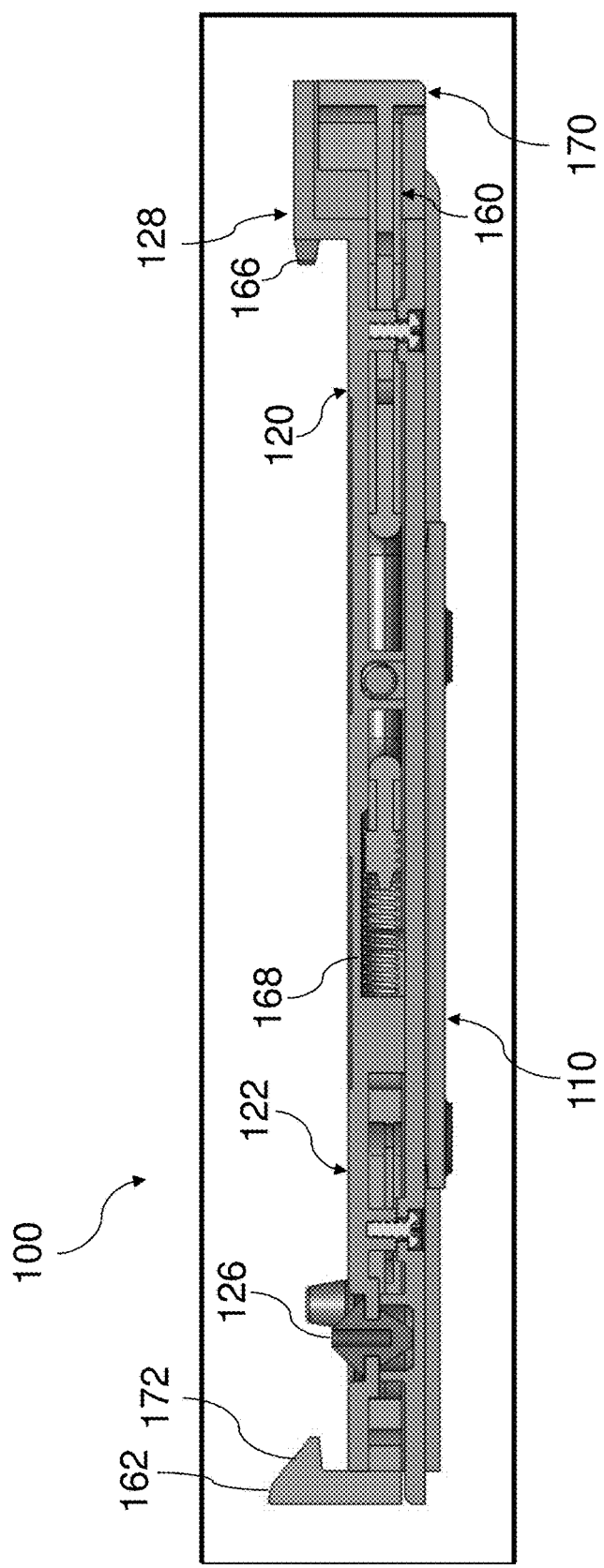
Figure 5:
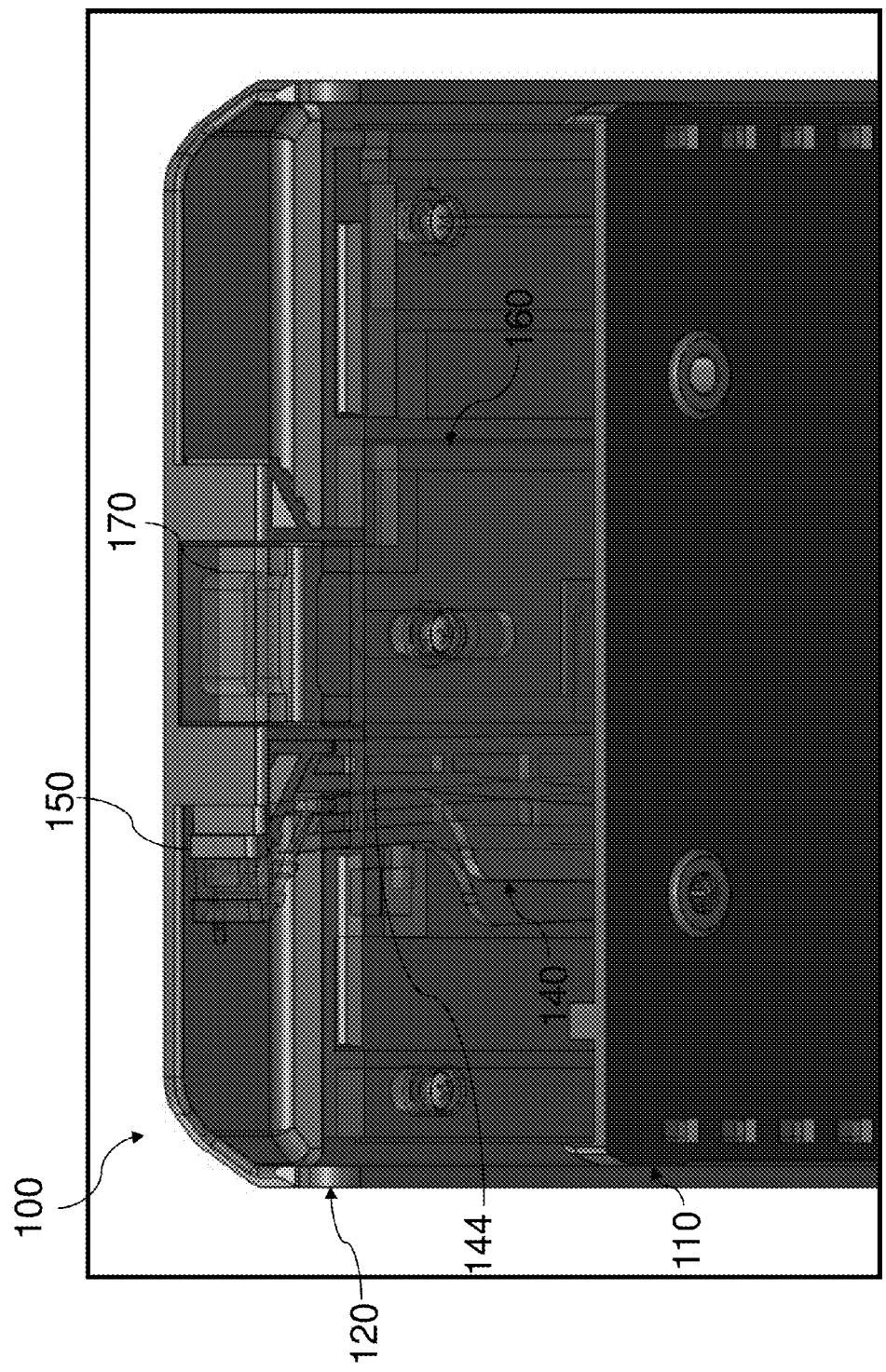
FIG. 5 is a diagram showing an exemplary latch of the apparatus of FIG. 1.

Latch 140 further includes at least one switch 150 for actuation by a user. Switch 150 enables a user to mechanically move latch 140 from the engaged position to the disengaged position, e.g. by pressing against the biasing force provided by biasing element 146. Once the user releases switch 150, biasing element 146 pushes latch 140 to be in the engaged position, in which projection 142 engages with at least one detent 114. Diagram views of both the engaged and disengaged positions of latch 140 are best shown in FIGS. 3 and 5.

Switch 150 is desirably accessible at a location external to apparatus 100. In particular, switch 150 is accessible at a location at the side of slide plate 120, so that a user can push on slide plate 120 while pressing switch 150. Accordingly, the sliding operation of slide plate 120 may desirably be performed with a single hand.

While latch 140 is described herein as being coupled to slide plate 120 and engaged with base 110, it will be understood that the invention is not so limited. To the contrary, latch 140 may be coupled to base 110 and engaged with slide plate 120 without department from the scope of the present invention.

Locking mechanism 160 is coupled to slide plate 120. Locking mechanism 160 may be movably coupled to slide plate 120 using one or more screws positioned in slots in locking mechanism 160. Locking mechanism 160 functions to lock the keyboard 50 or other object being mounted to slide plate 120. To this end, locking mechanism 160 is movable between a locked position and an unlocked position. In the locked position, locking mechanism 160 engages with the aperture of keyboard 50 to lock keyboard 50 to slide plate 120. In the unlocked position, locking mechanism 160 does not engage with the aperture of keyboard 50, enabling keyboard 50 to be removed from slide plate 120.

Locking mechanism 160 engages with a corresponding aperture coupled to keyboard 50. As set forth above, the aperture may be formed either directly in the housing of keyboard 50, or may indirectly form part of keyboard 50, e.g., as part of an adaptor plate which is coupled to the keyboard 50. In an exemplary embodiment, locking mechanism 160 includes a locking arm 162 which is positionable within the at least one aperture when the locking mechanism is in the locked position. Locking arm projects from an exterior of slide plate 120 toward the center of slide plate 120 in order to engage with a side surface of keyboard 50 when keyboard 50 is positioned against slide plate 120. Like latch 140, locking mechanism 160 has an elongated body 164 with locking arm 162 extending inward from an end of body 164 toward the aperture. Locking arm 162 is positioned such that when locking mechanism 160 is in the locked position, locking arm 162 engages with the aperture. This engagement between locking arm 162 and the aperture blocks keyboard 50 from being pulled away from slide plate 120.

Locking mechanism 160 may further include one or more ridges 166 which cooperate with locking arm 162 to lock keyboard 50 to slide plate 120. Ridges 166 extend inward from stop wall 128 toward a center of slide plate 122. In an exemplary embodiment, ridges 166 are positioned on one side of keyboard 50, and engage with keyboard 50 to hold that one side of keyboard 50 against slide plate 120. Ridges 166 may engage with corresponding apertures, as described above with respect to locking arm 162, or may contact or block a front surface of keyboard 50 to hold keyboard 50 against slide plate 120. Locking arm 162 is positioned on an opposite side of keyboard 50 from ridges 166, and holds the opposite side of keyboard 50 against slide plate 120 by engaging with the aperture of keyboard 50 in the manner described above. This engagement on both sides of keyboard 50 may be necessary to completely lock keyboard 50 to slide plate 120.

In a further embodiment, locking mechanism 160 includes a biasing element 168 for biasing locking mechanism 160 to be in the locked position. Locking mechanism 160 is slidable along the length of slide plate 120 for moving between the locked and unlocked positions, and biasing element 168 biases locking mechanism 160 to slide to the locked position.

Locking mechanism 160 further includes at least one button 170 for actuation by a user. Button 170 desirably is accessible at a location external to apparatus 100. More preferably, button 170 is accessible at a location near or adjacent to switch 150, so that both latch 140 and locking mechanism 160 may be actuated by the user at approximately the same location. Button 170 enables a user to mechanically move locking mechanism 160 from the locked position to the unlocked position, e.g. by pressing against the biasing force provided by biasing element 168. Once the user releases button 170, biasing element 168 pushes locking mechanism 160 to be in the locked position, in which locking arm 162 engages with the aperture of keyboard 50.

Exemplary mounting and unmounting operations of system 10 and apparatus 100 will now be described in accordance with aspects of the present invention. The exemplary operations described below may be particular desirable due to their ability to be performed with a single hand.

When a user wishes to mount keyboard 50, they may begin by positioning keyboard 50 against the mounting surface of slide plate 120. As part of this positioning, keyboard 50 may be engaged with ridges 166 on a lower edge of slide plate 120, to hold the lower edge of keyboard 50 against slide plate 120.

The upper portion of keyboard 50 is then pressed against bumper 126 in order to compress bumper 126. As keyboard 50 is pressed, keyboard 50 may contact a ramped surface 172 formed on an upper portion of locking arm 162. This contact between keyboard 50 and ramped surface 172 pushes locking mechanism 160 from the locked position to the unlocked position, against the bias provided by biasing element 168. Alternatively, the user may press button 170 in order to move locking mechanism 160 to the unlocked position while pressing keyboard 50 against bumper 126.

When bumper 126 is compressed by keyboard 50, and locking mechanism 160 is allowed to move back to the locked position, locking arm 162 enters and is positioned within the aperture of keyboard 50. The contact between locking arm 162 and the aperture holds keyboard 50 to slide plate 120. Additionally, the contact between the rear surface of the keyboard housing and bumper 126 prevents movement or rattling of keyboard 50 when mounted.

When a user wishes to unmount keyboard 50, they press button 170 in order to move locking mechanism 160 to the unlocked position. When locking arm 162 is disengaged from the aperture of keyboard 50, bumper 126 moves to its uncompressed state, and thereby presses keyboard 50 upward and away from slide plate 120.

When the user releases button 170, locking mechanism 160 moves toward its locked position. During this movement, the ramped surface 172 of locking arm 162 contacts the edge of the housing of keyboard 50 (due to the movement of keyboard 50 by bumper 126). This causes ramped surface 172 to further press keyboard 50 upward and away from slide plate 120 during movement to the locked position. Keyboard 50 may then be freely removed from slide plate 120.

System 10 and apparatus 100 are not limited to the above-described components, but may include alternative or additional components, as would be understood by one of ordinary skill in the art from the description herein.

Figure 6:
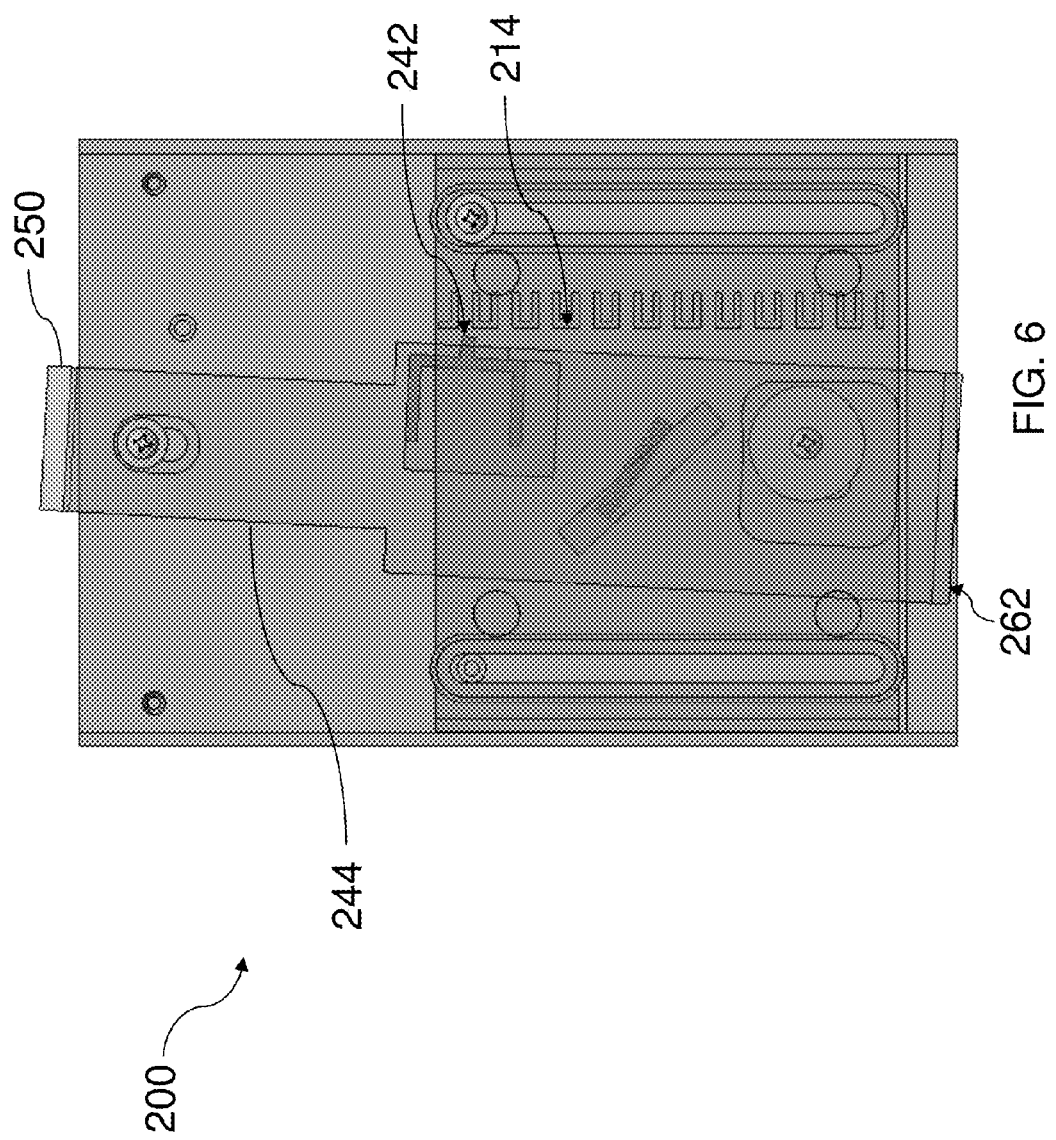
FIG. 6 is a top diagram of an alternative exemplary apparatus for mounting an object such as a keyboard within a vehicle in accordance with aspects of the present invention.

While latch 140 and locking mechanism 160 are primarily described herein as separate components, it will be understood by one of ordinary skill in the art from the description herein that they may be formed as an integrated component. FIG. 6 illustrates an exemplary apparatus 200 for mounting an object within a vehicle in accordance with aspects of the present invention. Apparatus 200 includes substantially the same components as apparatus 100, except as described below.

As shown in FIG. 6, the latch and locking mechanism in apparatus 200 are formed from a shared elongated body 244, instead of distinct elongated bodies. Body 244 has a projection 242 extending outward from body 244 toward a row of detents 214. Body 244 further includes a locking arm 262 for locking the objected to be mounted.

In one exemplary operation, body 244 can be moved left/right in FIG. 6 by sliding switch 250, in order to move projection 242 between an engaged position, in which projection 242 engages with at least one of detents 214, and a disengaged position, in which projection 242 disengages with at least one of detents 214. In another exemplary operation, body 244 can be moved up/down in FIG. 6 by pressing switch 250, in order to move locking arm 262 between a locked position and an unlocked position.

Apparatuses 100 and 200 are usable to securely mount objects, such that they can be readily secured within or removed from the vehicle. FIG. 7 illustrates exemplary keyboard mounting system 10 comprising apparatus 100 and a keyboard 50 to be mounted. In accordance with the operations of apparatus 100 described above, a keyboard 50 can be locked to or removed from apparatus 100 through the use of one hand, thereby allowing the user to quickly and easily mount keyboard 50 within a vehicle. Likewise, keyboard 50 can be repositioned by sliding the slide plate 120 of apparatus 100 through the use of one hand, thereby allowing the user to quickly and easily mount keyboard 50 within a vehicle.

Figure 8:
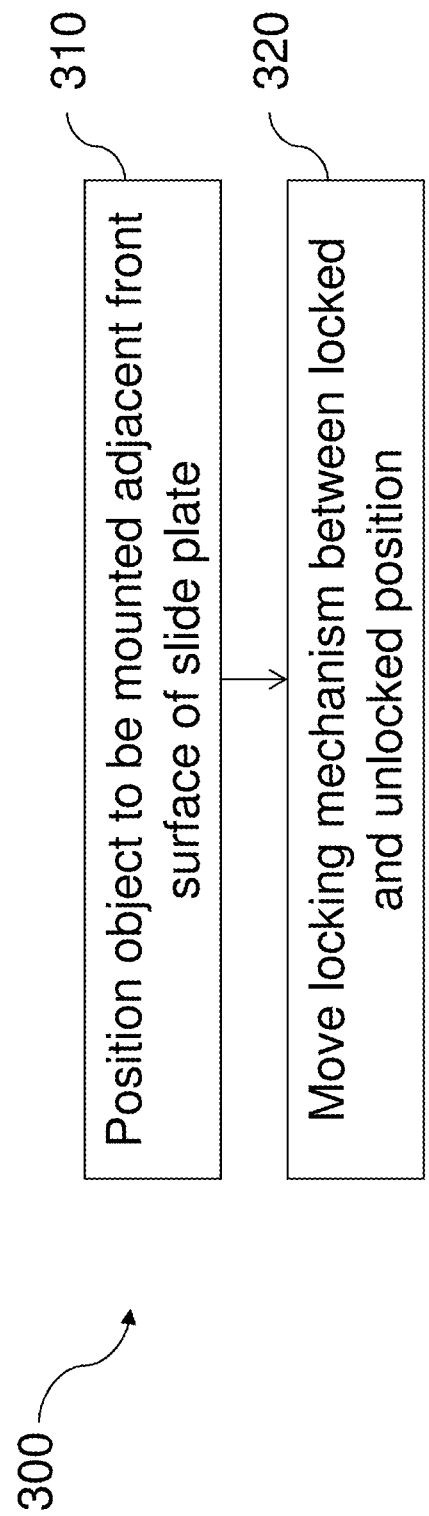
FIG. 8 is a flow chart of an exemplary method for mounting an object such as a keyboard within a vehicle in accordance with aspects of the present invention.

FIG. 8 illustrates an exemplary method 300 for mounting an object within a vehicle in accordance with aspects of the present invention. Method 300 is usable to securely mount objects such as keyboards, such that they can be readily secured within or removed from the vehicle. Like apparatus 100, method 300 is usable to securely mount keyboards. In general, method 300 includes positioning the object, and moving a locking mechanism. Additional details of method 300 are provided herein with reference to the components of apparatus 100.

In step 310, the object to be mounted is positioned adjacent the mounting surface of a slide plate of a mounting apparatus. In an exemplary embodiment, keyboard 50 is positioned adjacent mounting surface 122 of slide plate 120. As part of this positioning, keyboard 50 may be engaged with ridges 166 on a lower edge of slide plate 120, to hold the lower edge of keyboard 50 against slide plate 120. This positioning may further include pressing keyboard 50 against bumper 126 in order to compress bumper 126 until locking mechanism 160 engages with the aperture in keyboard 50. This contact between bumper 126 and locking mechanism 160 desirably limits rattling of keyboard 50 during movement of the vehicle.

In step 320, the locking mechanism is moved between a locked position and an unlocked position. In an exemplary embodiment, contact between keyboard 50 and ramped surface 172 pushes locking mechanism 160 from the locked position to the unlocked position, against the bias provided by biasing element 168. Alternatively, the user may press button 170 in order to move locking mechanism 160 to the unlocked position while pressing keyboard 50 against bumper 126. Then, locking mechanism 160 is allowed to move back from the unlocked position to the locked position, at which point locking arm 162 enters and is positioned within the aperture of keyboard 50.

When keyboard 50 defines the aperture, locking mechanism 160 directly engages keyboard 50 when in the locked position. When an adaptor plate is used which is affixed to keyboard 50 and defines the aperture, locking mechanism 160 indirectly engages keyboard 50 when in the locked position.

Method 300 is not limited to the above-described steps, but may include alternative or additional steps, as would be understood by one of ordinary skill in the art from the description herein.

For example, method 300 may include sliding a slide plate relative to a base, in order to reposition the object being mounted. In an exemplary embodiment, slide plate 120 is slidable relative to base 110 to reposition keyboard 50. This sliding step may further include engaging base 110 with a latch 140 in order to prevent the slide plate 120 from sliding once the keyboard 50 has been positioned in a desired location. Such engagement may take the form of engaging a projection 142 on latch 140 with one or more detents 114 formed on base 110.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A keyboard mounting system for a vehicle comprising:
   a keyboard comprising:
      a housing;
      one or more input elements coupled to the housing; and
      at least one aperture defined in the housing; and
   a mounting apparatus configured to receive the keyboard, the mounting apparatus comprising:
      a base comprising a plurality of detents;
      a slide plate coupled to the base, the slide plate having a mounting surface facing the keyboard when the keyboard is received by the mounting apparatus, the slide plate slidable in a defined direction relative to the base;
      a latch coupled to the slide plate, the latch movable between an engaged position that prevents the slide plate from sliding relative to the base and a disengaged position that does not prevent the slide plate from sliding relative to the base, the latch including at least one protection positioned to engage with at least one of the plurality of detents when the latch is in the engaged position; and
      a locking mechanism coupled to the slide plate, the locking mechanism movable between a locked position in which the locking mechanism engages the at least one aperture of the keyboard to lock the keyboard to the slide plate and an unlocked position in which the locking mechanism does not engage the at least one aperture of the keyboard.

2. The keyboard mounting system of claim 1, wherein the housing includes a front surface, a rear surface, and at least one side surface,
   the one or more input elements are positioned on the front surface of the housing,
   the aperture is defined in the at least one side surface of the housing, and
   the rear surface of the housing faces the mounting surface of the slide plate.

3. The keyboard mounting system of claim 1, wherein
the base includes a first slot extending in a predetermined direction,
the slide plate includes a second slot extending in the predetermined direction, and
further comprising a pin extending through the first and second slots, the pin at least partially defining the defined direction of sliding of the slide plate relative to the base.

4. The keyboard mounting system of claim 1, further comprising a biasing element positioned to bias the locking mechanism to be in the locked position.

5. The keyboard mounting system of claim 1, wherein
the locking mechanism includes a locking arm positionable within the at least one aperture when the locking mechanism is in the locked position.

6. A keyboard mounting system for a vehicle comprising:
a keyboard comprising:
  a housing;
  one or more input elements coupled the housing; and
  at least one aperture defined in the housing; and
a mounting apparatus configured to receive the keyboard, the mounting apparatus comprising:
  a base;
  a slide plate coupled to the base, the slide plate having a mounting surface facing the keyboard when the keyboard is received by the mounting apparatus, the slide plate slidable in a defined direction relative to the base, the slide plate further comprising at least one compressible bumper projecting from the mounting surface of the slide plate, the bumper contacting a rear surface of the housing;
  a latch coupled to the slide plate, the latch movable between an engaged position that prevents the slide plate from sliding relative to the base and a disengaged position that does not prevent the slide plate from sliding relative to the base; and
  a locking mechanism coupled to the slide plate, the locking mechanism movable between a locked position in which the locking mechanism engages the at least one aperture of the keyboard to lock the keyboard to the slide plate and an unlocked position in which the locking mechanism does not engage the at least one aperture of the keyboard, the locking mechanism including a locking arm positionable within the at least one aperture when the locking mechanism is in the locked position.

7. The keyboard mounting system of claim 6, wherein
the locking arm comprises a ramped surface on an upper portion thereof,
when the bumper is compressed by the keyboard and the locking mechanism is moved to the locked position, the locking arm is positioned within the at least one aperture, and
when the bumper is uncompressed by the keyboard and the locking mechanism is moved to the locked position, the ramped surface contacts the housing to move the keyboard away from the slide plate.

8. An apparatus for mounting an object within a vehicle comprising:
a base comprising a plurality of detents;
a slide plate coupled to the base and having a mounting surface facing the object being mounted, the slide plate slidable in a defined direction relative to the base;
a latch coupled to the slide plate, the latch movable between an engaged position that prevents the slide plate from sliding relative to the base and a disengaged position that does not prevent the slide plate from sliding relative to the base, the latch including at least one projection positioned to engage with at least one of the plurality of detents when the latch is in the engaged position; and
a locking mechanism coupled to the slide plate, the locking mechanism movable between a locked position in which the locking mechanism directly or indirectly engages the object being mounted to lock the object to the slide plate and an unlocked position in which the locking mechanism does not engage the object being mounted.

9. The apparatus of claim 8, wherein
the base includes a first slot extending in a predetermined direction,
the slide plate includes a second slot extending in the predetermined direction, and
further comprising a pin extending through the first and second slots, the pin at least partially defining the defined direction of sliding of the slide plate relative to the base.

10. The apparatus of claim 8, further comprising a biasing element positioned to bias the locking mechanism to be in the locked position.

11. The apparatus of claim 8, wherein
the locking mechanism includes a locking arm positionable to engage with at least one aperture coupled to the object being mounted when the locking mechanism is in the locked position.

12. The apparatus of claim 8, further comprising at least one adaptor plate configured to be coupled to the slide plate, the adaptor plate including a plurality of screws positioned to engage respective threaded openings in the object being mounted.

13. The apparatus of claim 12, wherein the adaptor plate defines at least one aperture positioned to receive the locking mechanism when the adaptor plate is affixed to the object being mounted and the locking mechanism is in the locked position.

14. An apparatus for mounting an object within a vehicle comprising:
a base;
a slide plate coupled to the base and having a mounting surface facing the object being mounted, the slide plate slidable in a defined direction relative to the base, the slide plate further comprising at least one compressible bumper formed on the mounting surface of the slide plate, the bumper positioned to directly or indirectly contact a rear surface of the object being mounted;
a latch coupled to the slide plate, the latch movable between an engaged position that prevents the slide plate from sliding relative to the base and a disengaged position that does not prevent the slide plate from sliding relative to the base; and
a locking mechanism coupled to the slide plate, the locking mechanism movable between a locked position in which the locking mechanism directly or indirectly engages the object being mounted to lock the object to the slide plate and an unlocked position in which the locking mechanism does not engage the object being mounted, the locking mechanism including a locking arm positionable to engage with at least one aperture coupled to the object being mounted when the locking mechanism is in the locked position.

15. The apparatus of claim 14, wherein
the locking arm comprises a ramped surface on an upper portion thereof, when the bumper is compressed by the object being mounted and the locking mechanism is moved to the locked position, the locking arm is positioned within the at least one aperture, and when the bumper is uncompressed by the object being mounted and the locking mechanism is moved to the locked position, the ramped surface directly or indirectly contacts the object being mounted to move the object away from the slide plate.

16. A method for mounting an object within a vehicle comprising:

positioning the object adjacent a mounting surface of a slide plate of a mounting apparatus;

sliding the slide plate relative to a base of the mounting apparatus in order to reposition the object;

engaging a projection of at least one latch with one or more detents formed on the base to prevent the slide plate from sliding relative to the base;

moving a locking mechanism of the mounting apparatus between a locked position in which the locking mechanism directly or indirectly engages the object to lock the object to the slide plate and an unlocked position in which the locking mechanism does not engage the object being mounted.

17. The method of claim 16, wherein the moving step comprises pushing the locking mechanism from the locked position to the unlocked position against a bias provided by a biasing element.

18. The method of claim 16, wherein the positioning step comprises pressing the object against a compressible bumper formed on the mounting surface of the slide plate.

\* \* \* \* \*